United States Patent
Scheitlin et al.

[11] 3,761,116
[45] Sept. 25, 1973

[54] TUBE-PLATE INTERCONNECTION

[75] Inventors: George Edward Scheitlin; Gene Richard Hanson, Columbus, Ohio

[73] Assignee: Arvin Industries, Inc., Columbus, Ind.

[22] Filed: May 22, 1972

[21] Appl. No.: 255,694

[52] U.S. Cl. ............................. 285/192, 285/222
[51] Int. Cl. ............................................. F16l 5/02
[58] Field of Search ............... 285/189, 192, 222, 285/159, 162, 205, 206, 208, 209; 248/56; 60/323, 322

[56] References Cited
UNITED STATES PATENTS

| | | | |
|---|---|---|---|
| 3,703,083 | 11/1972 | Tadokovo | 60/323 X |
| 3,653,205 | 4/1972 | Tadokovo | 60/322 |
| 3,523,590 | 8/1970 | Straw | 285/192 X |
| 3,581,494 | 6/1971 | Scheitlin | 60/323 X |
| 1,069,877 | 8/1913 | Hurst | 285/192 X |
| 1,491,873 | 4/1924 | McMurtrie | 285/206 X |
| 265,886 | 10/1882 | Stover | 285/205 X |
| 2,530,855 | 11/1950 | Bugg et al. | 285/222 X |
| 2,461,414 | 2/1949 | Donner | 285/192 X |

*Primary Examiner*—Thomas F. Callaghan
*Attorney*—Thomas P. Jenkins et al.

[57] ABSTRACT

An interconnection between a tube and a plate in which said tube is received in an opening in the plate and said tube and plate are movable radially with respect to each other, said tube and plate being radially movable with respect to the tube axis. A pair of washers are disposed on opposite sides of the plate around the tube and over the plate opening with a pair of projections on the tube holding the washers against said plate. One of said washers has a sleeve engageable with the other washer to prevent said washers from binding against the plate thereby permitting relative movement between said plate and tube.

3 Claims, 2 Drawing Figures

PATENTED SEP 25 1973  3,761,116

TUBE-PLATE INTERCONNECTION

BACKGROUND OF THE INVENTION

In the manufacture of various devices it is sometimes necessary to connect a tube to an opening in a plate by means of a slidable fit so that the tube and plate can expand and contract with respect to each other. An example of a connection of this type is shown in copending application Ser. No. 204,589, filed Dec. 3, 1971, and entitled "Exhaust Gas Manifold."

In forming such connections problems have been encountered in obtaining the proper tightness of fit between the structures interconnecting the tube and plate. If the connection is too tight, there will be no relative movement between the tube and plate. Conversely, if the connection is too loose, leakage will occur at the connection.

It is therefore an object of this invention to provide a tube-plate interconnection which will permit relative radial movement between the tube and plate but which will be resistant to leakage.

SUMMARY OF THE INVENTION

In accordance with one form of the invention, there is provided a plate having an opening found therein. A first annular washer is carried against one face of said plate and is provided with an axially extending sleeve at its inner circumference projecting through the plate opening. A second annular washer is carried against the opposite face of said plate and the end of said sleeve.

A tube projects through said washers and sleeve and is provided with a pair of axially spaced annular projections. The projections are in engagement with the washers for holding said washers against the opposed faces of the plate and interconnecting the tube to said plate. With the sleeve engaging the second washer, the projections will be prevented from bearing against said washers in a manner to cause said washers to bind against the opposed plate faces. Thus, the washers are slidably carried against said plate faces.

The plate opening has a cross-sectional extent greater than the outer diameter of the sleeve and smaller than the outer diameters of the washers. Thus, the plate and tube can move radially of tube axis with respect to each other with the washers sliding against the opposed plate faces. With said washers extending outwardly beyond the edges of the plate opening and the projections overlapping said washers little, if any leakage will occur at the tube-plate interconnection irrespective of any such relative movement between the tube and plate.

BRIEF DESCRIPTION OF THE DRAWINGS

The accompanying drawings illustrate the invention. In such drawings.

DETAILED DESCRIPTION OF THE PREFERRED EMBODIMENT

Figure 1:
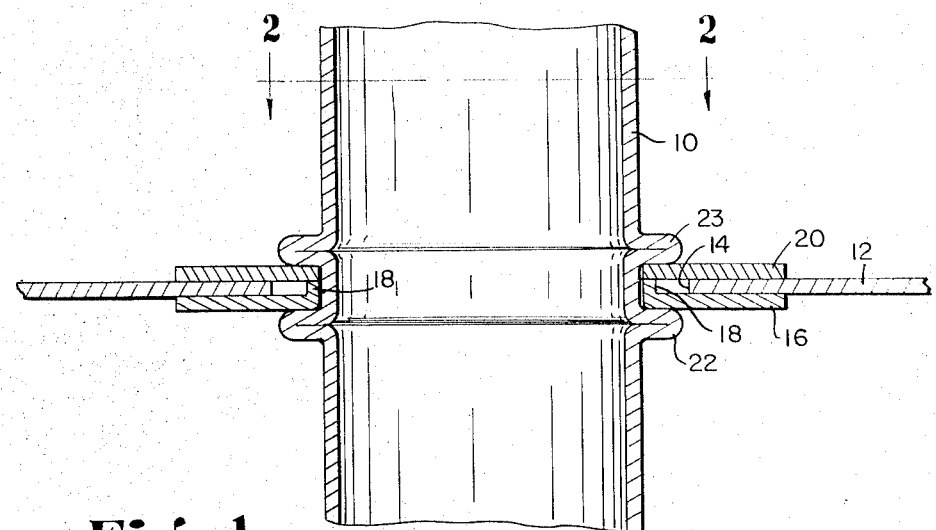
FIG. 1 is an axial section through a tube-plate interconnection embodying the invention.
Figure 2:
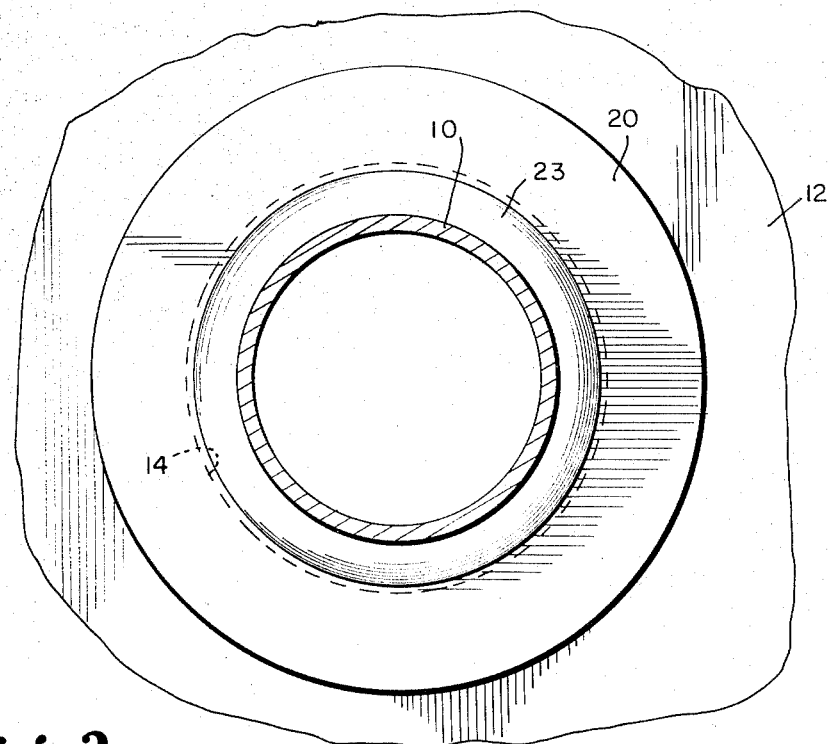
FIG. 2 is a transverse section taken on the line 2—2 of FIG. 1.

As shown in the drawings, this invention is concerned with the interconnection between a tube 10 and a plate 12 The plate is provided with an opening 14 through which the tube projects.

A first annular washer 16 is carried against one face of the plate 12. A sleeve 18 is coined upwardly around the inner circumference of washer 16 and projects axially through the plate opening 14. As shown, the outer diameter of the sleeve 18 is smaller than the cross-sectional extent of plate opening 14, and the outer diameter of washer 16 is substantially larger than said opening so that said washer extends outwardly over the edges of said opening against the adjacent plate face.

A second washer 20 is carried against the opposite face of the plate. As shown, the inner diameter of washer 20 corresponds to the diameter of the sleeve 18, and the outer diameter of said washer is substantially larger than the plate opening 14 so that washer 20, like washer 16, extends outwardly over the edges of said opening against the adjacent plate face. For reasons that will become more apparent hereinafter, the sleeve 18 has an axial length at least as great as the thickness of plate 12 so that washer 20 adjacent its inner circumference abuts the adjacent end of said sleeve and said sleeve provides a minimum spacing between the innter portions of said washers.

As best shown in FIG. 1, a pair of axially spaced annular projections 22 and 23 are provided on tube 10. The projection 22 bears against washer 16 and projection 23 bears against washer 20 to hold said washers against the plate 12 and to hold the tube and plate interconnected. With the sleeve 18 engaging the washer 20, the projections 22 and 23 are prevented from holding washers 16 and 20 in binding engagement with the plate. Thus, the plate is free to expand and contract radially with respect to the tube with the opposed plate faces sliding against the washers. During such sliding movement the overlapping relationships of the washers with the plate opening 14 and projections 22 and 23 will prevent leakage around the tube-plate interconnection. With the washers 16 and 20 being slidably retained against the opposed plate faces, the tube 10 is also free to expand and contract radially with respect to the plate 12. Again, during such movements the overlapping relationships of the washers with plate opening 14 and projections 22 and 23 will prevent gas leakage around the tube-plate interconnection.

While the invention has been illustrated as having the projections 22 and 23 formed integrally on the tube, it is to be understood, of course, that said projections can be in the form of collars welded or otherwise rigidly secured to the outer tube face. As will also be apparent, the plate need not be planar, but if desired, can have an arcuate configuration at or near its connection to the tube.

We claim:

1. A tube-plate interconnection comprising a plate having an opening formed therein, a first annular washer abutting one face of said plate, said first washer having a sleeve portion projecting through the opening in said plate, a second annular washer abutting the plate face opposite said one face and one end of said sleeve portion, the opening in said plate has a cross-section larger than the outer diameter of said sleeve portion and smaller than the outer diameters of said first and second washers, a tube extending through said second washer and sleeve, and a pair of annular projections fixedly positioned and on said tube abutting said first and second washers for retaining said washers in radial sliding sealing engagement with the opposed faces of said plate.

2. A tube-plate interconnection comprising a plate having an opening formed therein, a first annular washer abutting one face of said plate, said first washer having a sleeve portion projecting through the opening in said plate, said sleeve portion having a length at least equal to the thickness of said plate, a second annular washer abutting the plate face opposite said one face and one end of said sleeve portion, the opening in said plate having a cross-section larger than the outer diameter of said sleeve portion and smaller than the outer diameters of said first and second washers, a tube extending through said second washer and sleeve portion, and a pair of annular projections fixedly positioned on said tube and abutting said first and second washers for retaining said washers in radial sliding sealing engagement with the opposed faces of said plate.

3. A tube-plate interconnection comprising a plate having an opening formed therein, a pair of annular washers slidably carried against the opposed faces of said plate, said washers having inner and outer diameters respectively substantially smaller and greater than the cross-section of the plate opening, means extending between and engaging said washers through the opening in said plate to provide a minimum spacing between the inner portions of said washers, the opening in said plate having a cross-section larger than the outer cross-section of said means, a tube extending through said washers and said means, and a pair of annular projections fixedly positioned on said tube abutting said washers for retaining said washers in radial sliding sealing engagement with the opposed faces of said plate.

* * * * *